United States Patent [19]

Park

[11] Patent Number: 5,281,900
[45] Date of Patent: Jan. 25, 1994

[54] DC MOTOR CONTROLLER

[75] Inventor: Chan H. Park, Seoul, Rep. of Korea

[73] Assignee: Hyundai Electronics Industries Co., Ltd., Seoul, Rep. of Korea

[21] Appl. No.: 826,335

[22] Filed: Jan. 27, 1992

[30] Foreign Application Priority Data

Feb. 2, 1991 [KR] Rep. of Korea .................. 91-1801

[51] Int. Cl.$^5$ ............................................. H02P 7/29
[52] U.S. Cl. ................................. 318/139; 388/811; 388/907.5
[58] Field of Search ............... 318/139, 599; 388/804, 388/811, 819, 829, 831, 903, 907.5; 180/65.1, 65.2, 65.3

[56] References Cited

U.S. PATENT DOCUMENTS

| | | | |
|---|---|---|---|
| 3,808,481 | 4/1974 | Rippel | 318/139 |
| 4,188,569 | 2/1980 | Campbell | 318/139 X |
| 4,199,037 | 4/1980 | White | 180/65 C |
| 4,401,926 | 8/1983 | Morton et al. | 318/139 X |
| 4,479,080 | 10/1984 | Lambert | 318/139 X |
| 4,500,820 | 2/1985 | Noto et al. | 318/139 |
| 4,580,083 | 4/1986 | Omae et al. | 318/139 X |
| 4,730,151 | 3/1988 | Florey et al. | 318/139 X |
| 4,897,882 | 1/1990 | Pickering | 388/801 |
| 5,070,283 | 12/1991 | Avitan | 318/139 |
| 5,119,011 | 6/1992 | Lambert | 318/139 X |

*Primary Examiner*—Bentsu Ro
*Attorney, Agent, or Firm*—Townsend and Townsend Khourie and Crew

[57] ABSTRACT

A DC motor controller for use with a battery powered DC motor operatively positioned in a vehicle is disclosed. A power source-watch dog circuit 2 monitors a micro computer 8 and decreases the battery supplied voltage to below a predetermined voltage. A key switch input circuit 3 receives a switch-on signal generated by a key switch and outputs a signal to the power source-watch dog circuit 2 to initiate electrical power output from the battery 1 to the micro computer 8. A pedal input circuit 4, which includes a pedal for varying electrical resistance, converts the varied resistance into an analog signal and outputs the analog signal to the micro computer 8. The micro computer converts the analog signal to a digital signal and outputs the digital signal. A D/A converter converts the digital signal outputted by the micro computer into an analog signal and outputs the analog signal. A pulsewidth modulator 10 modulates the analog signal and outputs the modulated signal. A gate output circuit 11 generates a logic signal having a "high" or a "low" level according to the modulated signal outputted by the pulsewidth modulator 10 and outputs the logic signal to a motor driver 16 which operates the DC motor. A battery voltage sensor 7 senses the voltage of the battery 1 and outputs a battery voltage sensor signal to the micro computer 8. A temperature sensor 13 senses the temperature of the motor driver and outputs a temperature sensor signal to the micro computer 8. An output current sensor circuit 12 senses current flowing through the motor driver 16 and outputs a current sensor signal to the micro computer 8. A vehicle direction changing sensor 6 prevents an overload of the DC motor 17 by sensing an abrupt change in the direction the vehicle is being driven and outputs a vehicle direction changing sensor signal to the micro computer 8.

13 Claims, 7 Drawing Sheets

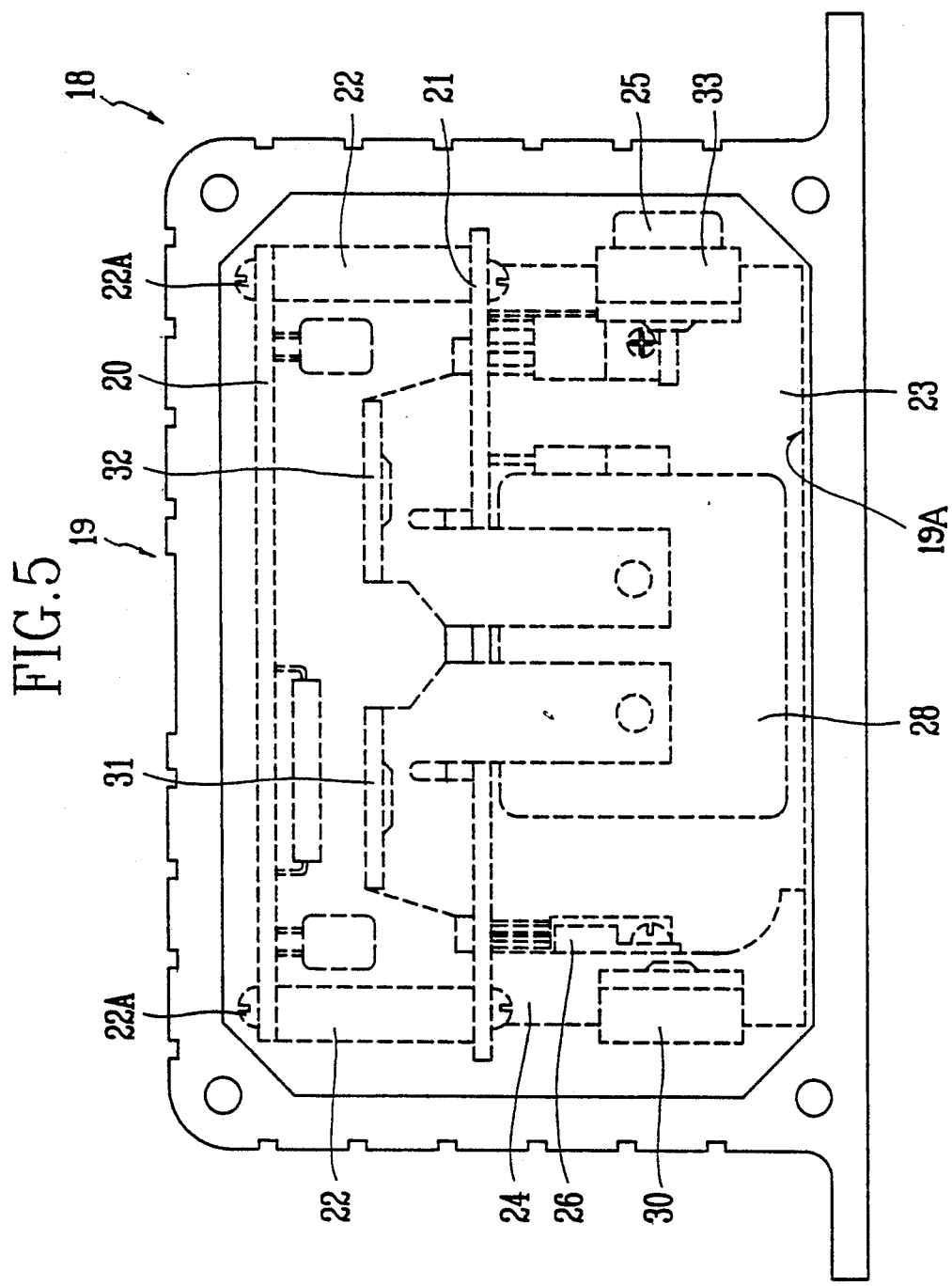

DC MOTOR CONTROLLER

BACKGROUND OF INVENTION

1. Field of the Invention

The invention relates to a DC motor controller, and more particularly, to a DC motor controller useful for controlling a DC traction motor of a vehicle where the motor is operated with a DC power source such as a battery or the like.

2. Information Disclosure Statement

Generally, various technological paths relating to the DC motor controller have been suggested and used in industry. The DC motor controller is widely used for controlling a traction motor of a vehicle.

A conventional DC motor controller comprises an electrical control system for reversing the rotational direction of the motor and is described in U.S. Pat. No. 3,188,545 issued to Sheheen in June 1965. A control system for a battery driven motor is described in U.S. Pat. No. 3,349,309 issued to Danne Hell on October 1967. A controller which enables the reversal of the rotational direction of a DC motor and which comprises a rectifier, a permanent magnet and a rotor is described in U.S. Pat. No. 4,292,573 issued to Ebert, et al., on September 1981, and which is related with U.S. Pat. No. 3,188,545.

A pulsewidth modulation control system for supplying a voltage pulse of various pulsewidths from the battery to the motor is described in U.S. Pat. No. 3,855,520. A control circuit for controlling the amount of current for an electric motor by utilizing a chopper circuit connected in series with a battery is described in U.S. Pat. No. 4,211,961 which issued to Marumoto in July 1980.

However, because the operation of the motor by the above prior art DC motor controllers is controlled with an analog signal by utilizing an operational amplifier, the control speed and reliability of the motor are significantly reduced.

Therefore, an object of the present invention is to provide a DC driven motor controller which can solve the above described disadvantages by increasing the control speed of the motor with digital signal processing utilizing a micro computer, and by simplifying the complicated circuit of the prior art controllers.

The preceding object should be construed as merely presenting a few of the more pertinent features and applications of the invention. Many other beneficial results can be obtained by applying the disclosed invention in a different manner or modifying the invention within the scope of the disclosure. Accordingly, other objects and a fuller understanding of the invention may be had by referring to both the summary of the invention and the detailed description, below, which describe the preferred embodiment in addition to the scope of the invention defined by the claims considered in conjunction with the accompanying drawings.

SUMMARY OF THE INVENTION

The DC motor controller of the present invention is defined by the claims with a specific embodiment shown in the attached drawings. For the purpose of summarizing the invention, the invention relates to a DC motor controller for use with a battery powered DC motor, the controller comprising a micro computer 8 and a power source-watch dog circuit 2 which monitors the micro computer 8 and which decreases the battery supplied voltage to below a predetermined voltage in order to electrically supply the micro computer and like components with their required operational voltage. A key switch input circuit 3 receives a switch-on signal generated by a key switch and outputs a signal to the power source-watch dog circuit 2 to initiate electrical power output from the battery 1 to the micro computer 8. A pedal input circuit 4, which includes a pedal which enables the operator of the vehicle to vary the electrical resistance in accordance with the extent the pedal is pressed, is employed. The pedal input circuit 4 converts the varied resistance into an analog signal and outputs the analog signal to the micro computer 8. The micro computer converts the analog signal to a digital signal and outputs the digital signal. A D/A converter converts the digital signal outputted by the micro computer into an analog signal and outputs the analog signal. A pulsewidth modulator 10 modulates the analog signal outputted by the D/A converter and outputs the modulated signal. A gate output circuit 11 generates a logic signal having a "high" or a "low" level according to the modulated signal input by the pulsewidth modulator 10 and outputs the logic signal to a motor driver 16 which operates the DC motor in accordance with the logic signal outputted from the gate output circuit 11.

Preferably, the DC motor controller includes at least one of the following: an output current sensor circuit 12 which senses the current flowing through the motor driver 16 and outputs a current sensor signal to the micro computer 8; a temperature sensor 13 senses the temperature of the motor driver and outputs a temperature sensor signal to the micro computer 8; a vehicle direction changing sensor 6 which prevents an overload of the DC motor 17 by sensing an abrupt change in direction the vehicle is being driven and outputs a vehicle direction changing sensor signal to the micro computer 8; and a battery voltage sensor 7 which senses the voltage of the battery 1 and outputs a battery voltage sensor signal to the micro computer 8. Most preferably, the DC motor controller includes each of the above devices.

A battery regulation circuit 5 is preferably included since it provides for uniform electrical power to the DC motor 17.

The DC motor controller according to the present invention is for use with a battery powered DC motor operatively positioned in a vehicle such as a golf cart. However, other uses of the DC motor controller can be envisioned.

The motor driver 16 preferably includes a first, a second, a third, a fourth, a fifth and a sixth field effect transistor (FET) driver 41–46 electrically connected in parallel, with each of the FET drivers comprising a free wheeling diode D1 connected to a B+terminal of a DC power source. A MOSFET Q1 with the electrodes thereof connected to the freewheeling diode and to ground, respectively, and with the gate thereof connected to a resistor R1 which is connected to the gate output circuit 11. A capacitor C1 is connected between the B+terminal and the free wheeling diode D1 and to ground. A MOSFET Q2 with the electrodes thereof connected to a connection point P2 between the free wheeling diode D1 and MOSFET Q1 and ground, respectively, and with the gate thereof connected to a resistor R2. A diode D2 and a Zener diode DZ1 are connected in series between the connection point P2 and the gate terminal of the MOSFET Q2 and the motor device 15 is connected to the connection point P2.

A case 19 for mounting the motor driver and dissipates the heat generated by the components of the DC controller is preferred and comprises a control printed circuit board (PCB) 20 and a drive printed circuit board (PCB) 21 positioned in the case. A third heat dissipating plate 22 secures the control PCB 20 and the drive PCB 21 with the control PCB spaced apart from the drive PCB. A capacitor 28 is secured below and in a mid-portion of the drive PCB 21. A first heat dissipating plate 23 is mounted opposite the capacitor 28 on the drive PCB 21 for dissipating heat generated by the MOSFETs 25 of each of the FET drivers mounted thereon. A second heat dissipating plate 24 is mounted between the first heat dissipating plate 23 and the capacitor 28 on the drive PCB 21 for dissipating heat generated by the free wheeling diodes 26 of each of the FET drivers mounted thereon. A first bus bar 29 is secured on the first heat dissipating plate 23 for supplying electrical power to the MOSFETs 25 mounted on the heat dissipating plate 23. A second bus bar 30 is secured at a side of the first heat dissipating plate 23 and the second heat dissipating plate 24 for supplying negative electrical power to the motor device. A third bus bar 31 of T type construction is secured to the drive PCB 21 and is connected to a positive terminal of the capacitor 28 and a positive terminal of the drive PCB 21. A fourth bus bar 32 of T type construction is connected to both a negative terminal of the capacitor 28 and a ground terminal of the drive PCB 21, and is connected to the first bus bar 29 secured to the first heat sink part 23 via a jumper bus bar 35, to thereby secure it to the drive PCB 21. A fifth bus bar 33 electrically insulated from and secured to another side of the first heat sink plate 23 has a pair of plug diodes 27 secured thereto. A sixth bus bar 34 which interconnects cathode terminals of the plug diodes 27 to the drive PCB 21, one side of which is secured to one side of the plug diodes 27, and the other side of which is fixed to the drive PCB 21 is used.

The more pertinent and important features of the present invention have been outlined above in order that the detailed description of the invention which follows will be better understood and that the present contribution to the art can be fully appreciated. Additional features of the invention described hereinafter form the subject of the claims of the invention. Those skilled in the art can appreciate that the conception and the specific embodiment disclosed herein may be readily utilized as a basis for modifying or designing other structures for carrying out the same purposes of the present invention. Further, those skilled in the art can realize that such equivalent constructions do not depart from the spirit and scope of the invention as set forth in the claims.

BRIEF DESCRIPTION OF THE DRAWINGS

For fuller understanding of the nature and objects of the invention, reference should be had to the following detailed description taken in conjunction with the accompanying drawings in which:

FIG. 5 is a front view of the mounting body shown in FIG. 4.

Similar reference characters refer to similar parts throughout the several views of the drawings.

DETAILED DESCRIPTION OF THE INVENTION

Figure 1:
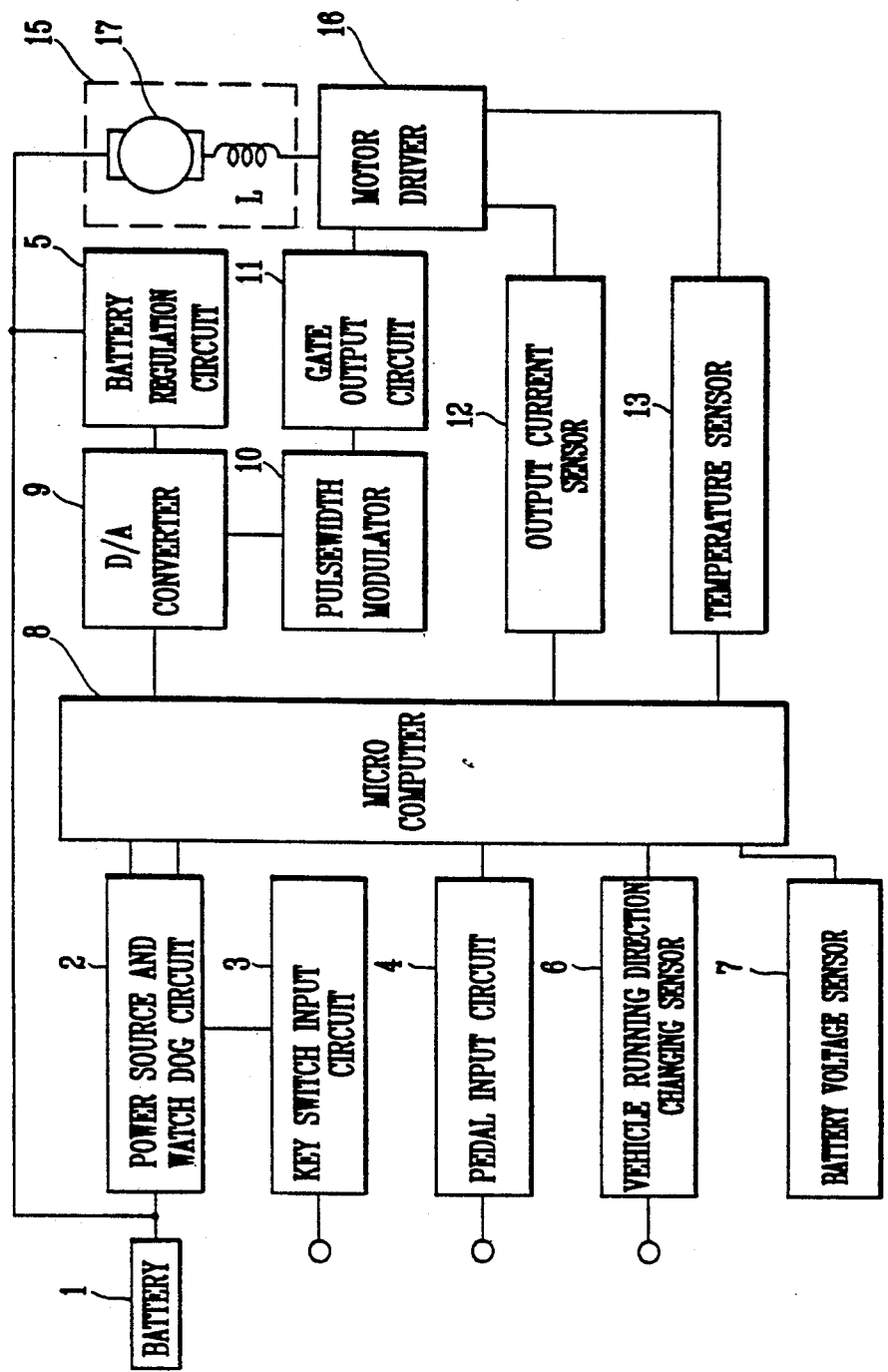
FIG. 1 is a block diagram of a DC motor controller of the present invention.

FIG. 1 is a block diagram of a DC motor controller used in a vehicle in accordance with the present invention.

A battery 1 for supplying DC is connected to a power source-watch dog circuit 2, which monitors the operation of a micro computer 8 and which drops the supplied battery voltage to below a predetermined voltage in order to supply the semiconductor components such as the micro computer. The battery is also connected to a DC motor device 15 and to a battery regulation circuit 5 which ensures uniform electrical power to the DC motor 17. The power source-watch dog circuit 2 is connected to the micro computer 8 and to a key switch input circuit 3. A pedal input circuit 4 having a foot pedal (not shown), or the like, to vary the resistance and which converts the variation of the resistance value into an analog signal, i.e. a pedal input step signal, which is output to the micro computer 8. The micro computer 8 converts the analog signal received from the pedal input circuit to a digital signal, i.e. an output step signal, and outputs the digital signal to a digital/analog (D/A) converter 9 which converts the digital signal into an analog signal which it outputs to a pulsewidth modulator 10. The pulsewidth modulator modulates the analog signal and outputs a modulated signal to a gate output circuit 11 which generates a logic signal of a "high" or a "low" level according to the modulated signal inputted from the pulsewidth modulator 10. The logic signal of the gate output circuit 11 is outputted to the motor driver 16 which operates a DC driven motor in accordance with the logic signal outputted from the gate output circuit 11

A vehicle direction changing sensor 6 prevents an overload of the driving motor 17 by sensing an abrupt change in the direction the vehicle is being driven is also connected to the micro computer 8. Also, a battery voltage sensor 7 for sensing the voltage of the battery 1 is connected to the microcomputer 8.

The motor driver 16, which will be described in detail later, consists of a plurality of power circuit components, for example, field effect transistors (FETs), diodes, etc. which emit high amounts of heat in use. Thus, both the construction of the circuit and component arrangement in the power circuit is critical in view of the great amount of heat emitted during use to prevent thermal failure of any of the components. The mounting body 18 (FIG. 4) is of a construction which promotes heat dissipation and heat loss from the power circuit components.

An output current sensor circuit 12 is connected between the motor driver 16 and the micro computer 8 for sensing the output current to the motor driver 16. A temperature sensor 13 is connected between the micro computer 8 and the motor driver 16 for sensing the temperature of the motor driver.

The operation of the present invention as described above is given below.

When a switch-on signal is input to the key switch input circuit 3 according to the on operation of the key switch (not shown), the electrical power of the battery 1 is applied to the micro computer 8 via the power source-watch dog circuit 2. The micro computer initializes RAM (random access memory) and register (not shown) provided therein to perform normal operation. If the pedal (not shown) is pressed, the condition of the pedal being pressed is converted to a resistance value which in turn is converted into an analog signal by the pedal input circuit 4 and outputted to the micro computer 8.

The micro computer 8 converts the analog signal outputted by pedal input circuit 4 into a digital signal which varies according to the condition of the pedal being pressed. The digital signal is outputted to the D/A converter 9 where it is converted into an analog signal which is outputted to the pulsewidth modulator 10. The pulsewidth modulator 10 includes a ramp waveform generator (not shown) and modulates the ramp waveform into a pulsewidth, where the duty ratio of the pulsewidth modulation is determined according to the analog signal outputted by the D/A converter 9. Therefore, the modulated signal outputted from the pulsewidth modulator 10 to the gate output circuit 11 varies with the digital signal input by the micro computer 8 to the D/A converter 9.

The gate output circuit 11 generates a "high" or a "low" level logic signal depending upon to the modulated signal outputted by the pulsewidth modulator 10 and supplies the respective logic signal to the motor driver 16, so that the motor device 15 operates according to the output signal outputted from the motor driver 16. If a motor reverse direction output signal output by the motor driver 16 (operator initiated) is instantaneously (steadily or constantly) applied to the DC driven motor device 15 during operation, a large load will be imposed on the motor 17. Such action is referred to as "plug braking" and is sensed by the vehicle direction changing sensor 6. If a plug braking signal is detected, the micro computer senses it and reduces the extent of the load due to plug braking by proper adjustment of the motor reverse direction output signal generated by the motor driver 16.

The output current sensor 12 senses the current flowing through the motor driver 16 and inputs the same into the micro computer 8. The temperature sensor 13 detects the temperature of the motor driver 16 and inputs the detected signal into the micro computer 8, the description of which is given with reference to FIG. 2A.

Figure 2A:
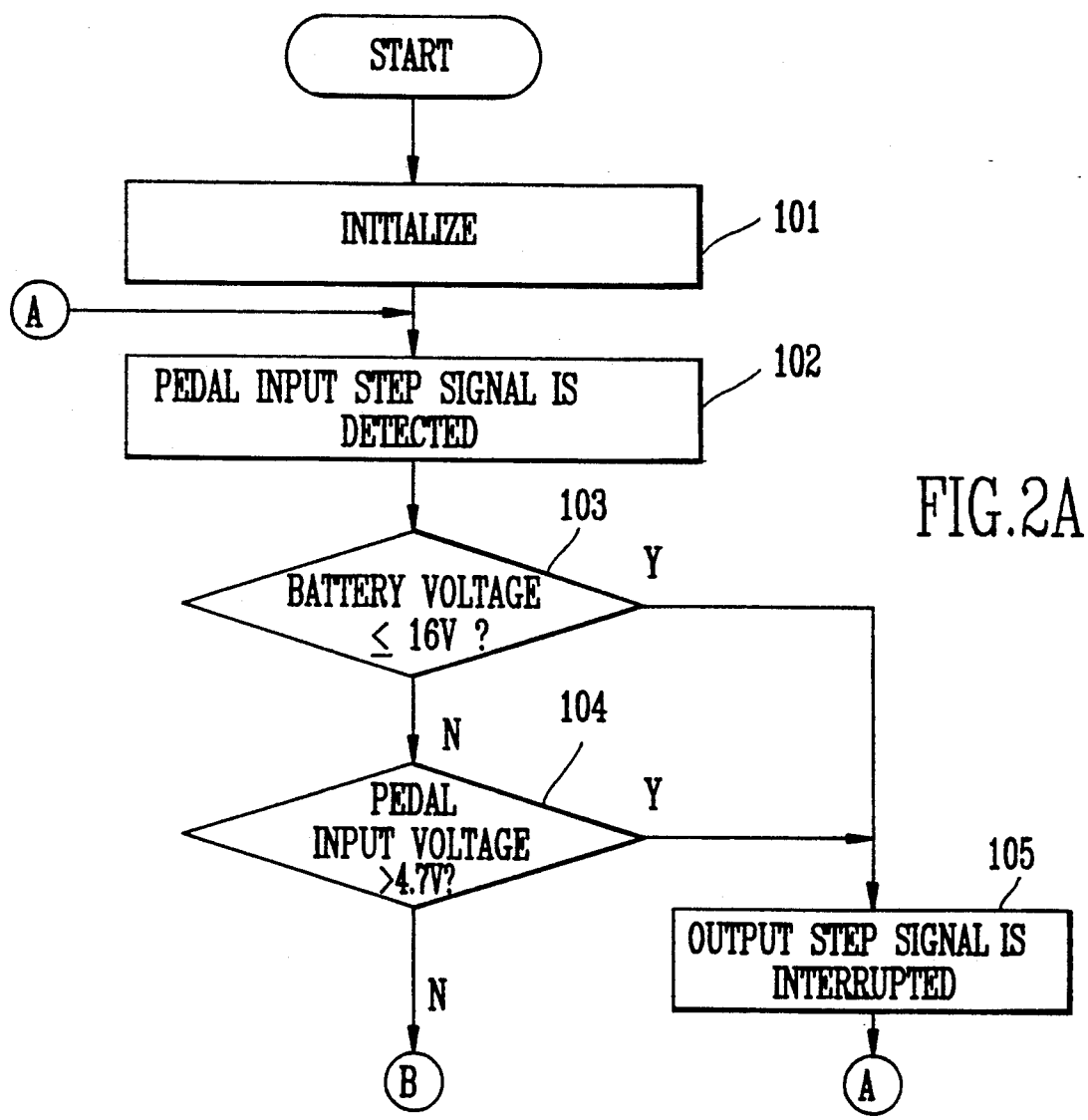
FIGS. 2A to 2D are flow charts to illustrate the operation of the controller shown in FIG. 1.
Figure 2B:
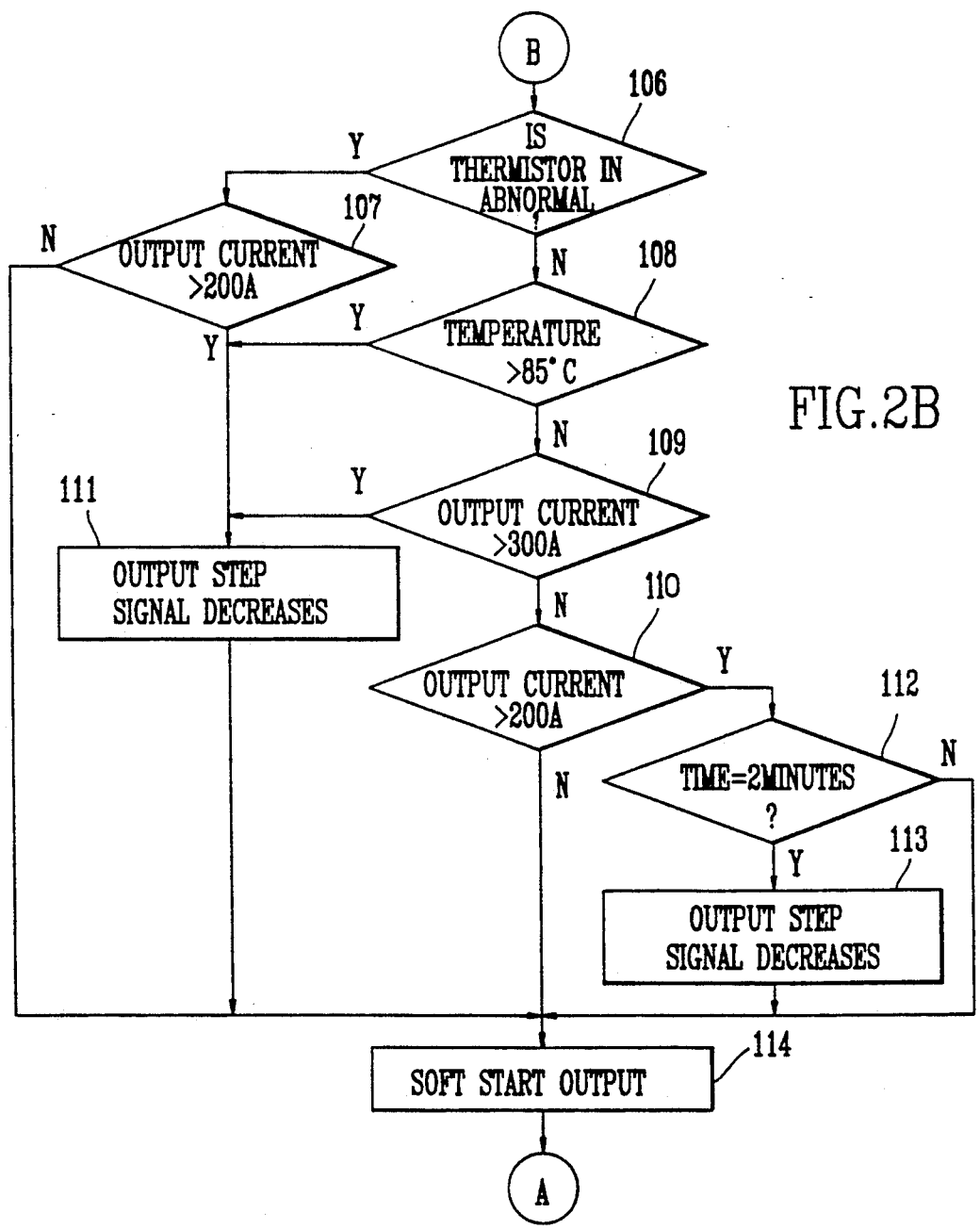

FIGS. 2A and 2B are flow charts illustrating the operation of the motor controller of FIG. 1.

Referring to FIG. 2A, at step 101, all the data of the micro computer 8 are initialized with a start signal, then proceeding to step 102. At step 102 the pedal input step signal is detected, and it then proceeds to step 103.

At step 103, it is determined whether the battery voltage inputted to the micro computer 8 by the battery voltage sensor 7 is lower than, for example, 16V. If the battery voltage is lower, it proceeds to step 105 where the output step signal is gradually interrupted to ultimately stop the operation of the motor. If the battery voltage is higher, it proceeds to step 104. At step 104 it is determined whether the pedal input voltage inputted by the pedal input circuit 4 is higher than 4.7V, and if it is, it proceeds to step 105, where the output step signal is gradually interrupted, and if not, it proceeds to step 106.

Referring to FIG. 2B, at step 106 it is determined whether a thermistor (not shown) provided in the temperature sensor 13 is in an abnormal condition. If the thermistor is in an abnormal condition, it then proceeds to step 107, and if not, it proceeds to step 108.

At step 107 it is determined whether the output current inputted from the output current sensor 12 is higher than 200 amperes (Amp). If the output current is higher than 200 Amp., it then proceeds to step 111, and if not, it proceeds to step 114.

At step 108 it is determined whether the temperature condition inputted by the temperature sensor 13 is higher than, for example, 85 degrees Celsius. If the sensed temperature is higher, it proceeds to step 111, and if not, it proceeds to step 109.

At step 109 it is determined whether the current inputted through the output current sensor 12 is higher than 300 Amp. If it is, it proceeds to step 111, and if not, it proceeds to step 110.

At step 110 it is determined whether the current inputted through the output current sensor 12 is higher than 200 Amp., and if it is, it proceeds to step 112, and if not, it proceeds to step 114.

At step 111 the output step signal is reduced, that is, the pulsewidth of the output step signal is reduced, and it proceeds to step 114.

At step 112, it is determined whether the motor operation time is 2 minutes, and if it is, it proceeds to step 113, and if not, it proceeds to step 114.

At step 113 the output step signal is decreased, and then it proceeds to step 114. At step 114 the output step signal is gradually increased to perform a soft, i.e. slow, start of the motor.

Figure 2C:
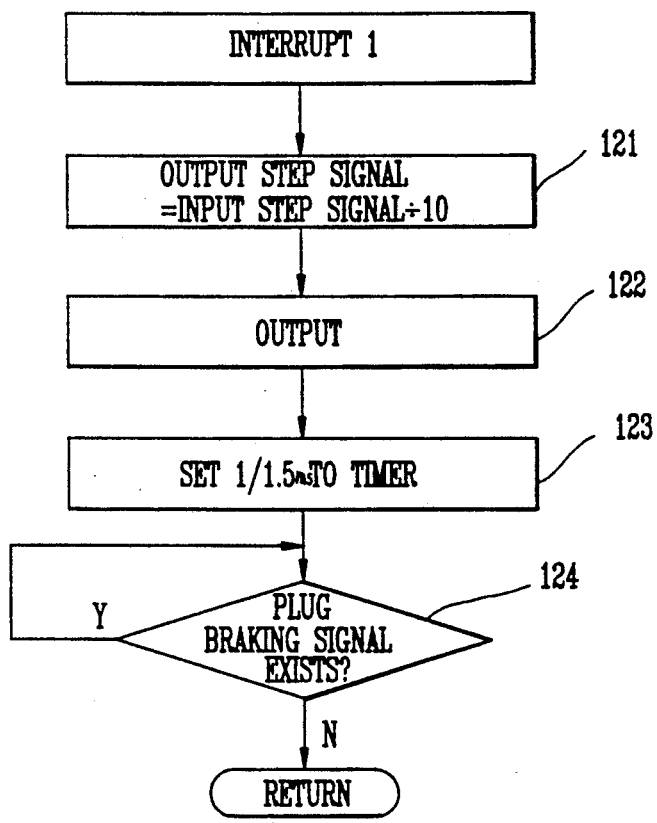
Figure 2D:
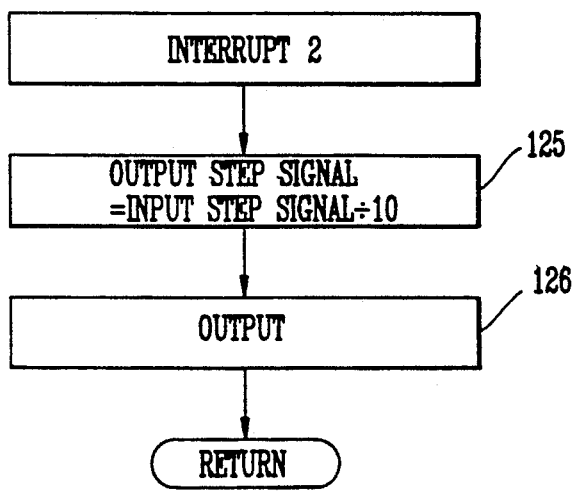

FIGS. 2C and 2D are the interrupt routines of FIGS. 2A and 2B. If, for example, the driving direction of the motor is abruptly changed, the plug braking signal is generated by the motor driver 16 which is sensed at the vehicle direction changing sensor 6 and an interrupt signal is applied. If the interrupt signal is applied, the output step signal is decreased to 1/10 of the input step signal at step 121. It proceeds to step 122 where the output step signal is outputted, and it then proceeds to step 123. At step 123 the time, 1/1.5 milliseconds (ms) is set on a timer (not shown) in the micro computer 8, and it proceeds to step 124.

However, if the set time becomes "0", the interrupt signal is again applied (interrupt 2), thereby performing the routine of FIG. 2D. That is, after deciding the output step signal by decreasing the input step signal to 1/10 at step 125, it proceeds to step 126 where the output step signal is outputted. It then returns to the step 123 of FIG. 2C where the time, 1/1.5 ms is set again to the timer. At step 124 it is determined whether the plug braking signal exists or not. If the plug braking signal is present, the interrupt signal of FIG. 2C is applied again, thereby performing the above mentioned operation continuously. If the plug braking signal is not present, it departs the interrupt routines to perform the routines of FIG. 2A and 2B.

Figure 3:
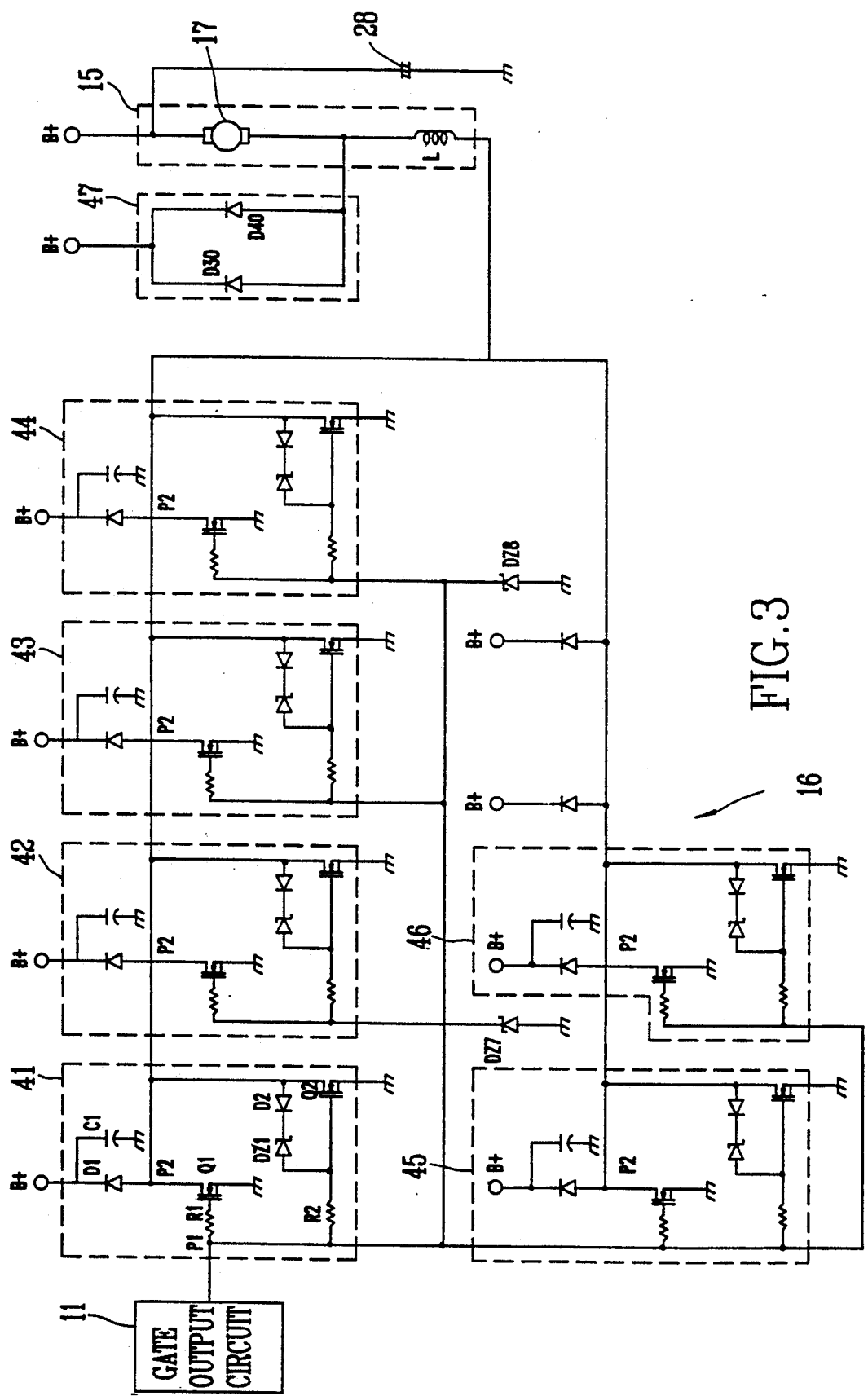
FIG. 3 is a detailed circuit diagram of a motor driver shown in FIG. 1.

FIG. 3 is a detailed circuit diagram of the motor driver 16. The motor driver 16 includes a first to sixth FET drivers 41 to 46 each of which are provided with a number of power components. The FET drivers are connected in parallel. The motor driver 16 is connected in series to the motor device 15. A plug diode circuit 47 is connected in parallel to the motor 17 of the motor device 15. Since the first to sixth FET drivers 41 to 46 are identical relative to each other in construction, only the first FET driver 41 will be described hereinafter for the sake of brevity.

The motor 17 of the motor device 15 is connected to diodes D30 and D40 of the plug diode circuit 47, which are connected in parallel relative to each other. One terminal of the motor 17 is connected both to a B+terminal and to the ground via a capacitor 28, and the other terminal of motor 17 is connected to the first to sixth FET driver 41 to 46 through a field coil (L).

Referring only to the first FET driver 41 as mentioned above, a free wheeling diode D1 which is connected to the B+terminal of the power source and connected to the ground via a MOSFET Q1. The gate terminal of the MOSFET Q1 is connected to the gate output circuit 11 (FIG. 1) via a resistor R1. A connection point P1 between the gate output circuit 11 and the resistor R1 is connected to the gate terminal of the MOSFET Q2 via a resistor R2 which is connected to ground via Zener diodes DZ7 and DZ8, respectively.

A connection point P2 between the MOSFET Q1 and the free wheeling diode D1 is grounded via the MOSFET Q2, and is also connected to the gate terminal of the MOSFET Q2 via a diode D2 and a Zener diode DZ1. The connection point P2 is also connected to each connection point P2 of the second to sixth FET drivers 42 to 46 and is connected to the field coil "L" of the motor device 15, the operation of which is described below. A capacitor C1 is connected between the ground and a connection point positioned between the free wheeling diode D1 and the B+power source terminal.

When, for example, a "high"level signal is outputted from the gate output circuit 11, the MOSFET Q1 turns "ON" so that the output shaft of motor 17 of the motor device 15 rotates, whereas when a "low" level signal is outputted, the MOSFET Q1 turns "OFF" so that electrical power is not supplied to the motor 17. At this time a reverse directional torque instantaneously occurs at the motor 17. However, this reverse directional torque is removed by the free wheeling diode D1.

The diodes D30 and D40 of the plug diode circuit 47 are connected to the motor 17 in parallel in reverse direction to prevent the reverse directional current which flows through the field coil "L" from flowing to the motor 17 when the running direction of the vehicle is changed abruptly.

Figure 4:
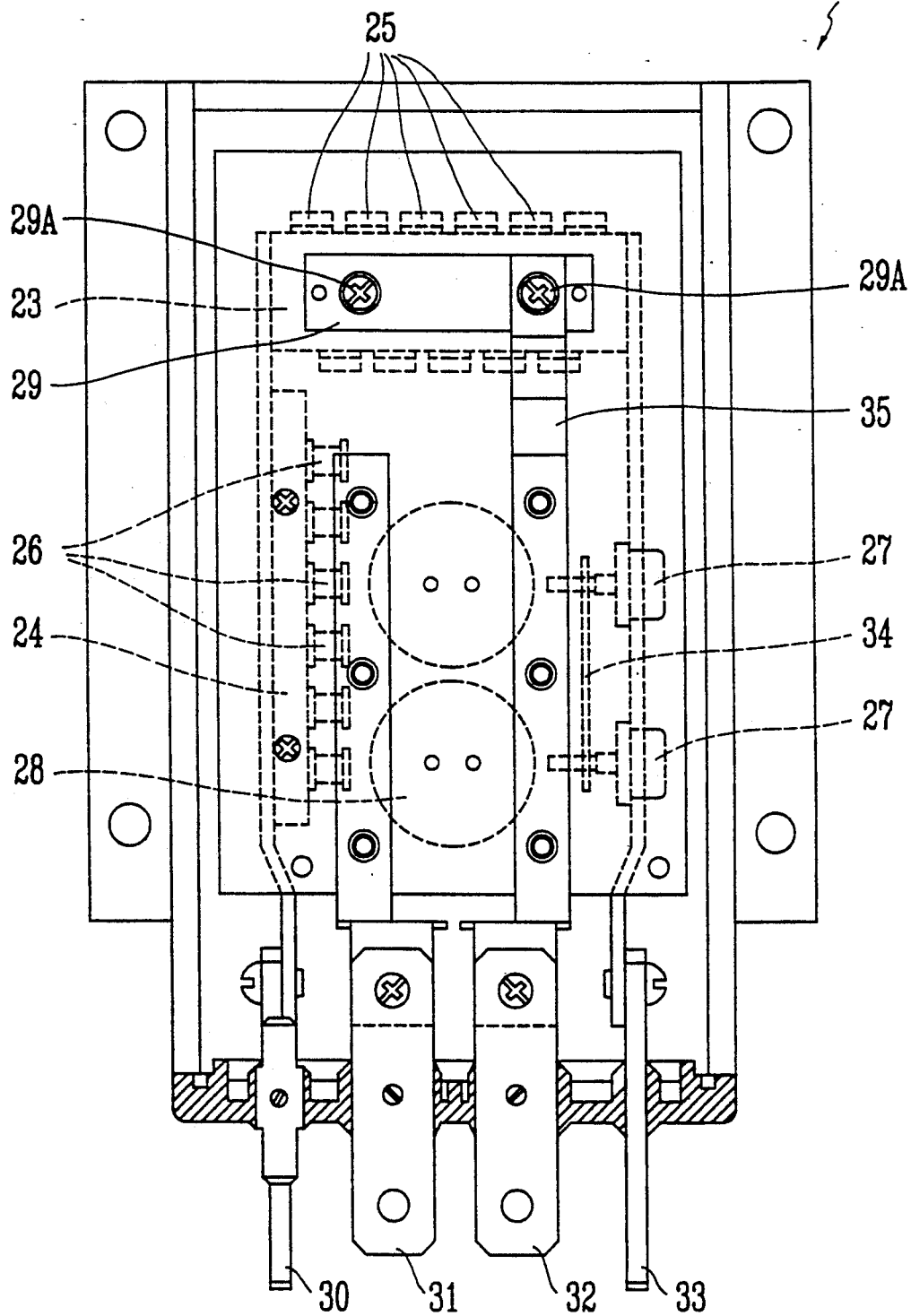
FIG. 4 is a plan view of a mounting body to mount constituting elements of the motor driver of the present invention.

FIG. 4 is a plan view of the mounting body 18 for efficiently mounting the circuit constituting elements of the motor driver 16 of the present invention.

FIG. 5 is a front view of the mounting body 18, the construction of which is described in detail with reference to FIGS. 3, 4 and 5.

In the circuit of the motor driver 16 used in the present application, the first to sixth FET drivers 41 to 46 emit heat when in operation due to the respective MOSFETs Q1 and Q2 and free wheeling diodes D1. Also, the diodes D30 and D40 of the plug diode circuit 47 are power elements connected directly to the motor 17 and which emit a lot of heat.

However, in accordance with the present invention, the heat related problems are solved by providing the mounting body 18 for the motor driver to effectively solve, in particular, the problem of arrangement of the power elements and the problem of heat emission in the circuit construction of the motor driver 16. A description follows with reference to the drawings.

Within a surrounding case 19, FIG. 5, is mounted a control printed circuit board (PCB) 20 of a certain area and a drive PCB 21 of a certain area in a manner to maintain a predetermined distance separating them and with two side edges of each of the PCBs interconnected by a third heat sink plate 22 utilizing bolts 22A, and with the cylindrical capacitor 28 positioned at the bottom of the PCB 21.

At the back of the drive PCB 21 a first heat sink plate 23 for dissipating the heat generated by the plurality of MOSFETs 25 is secured to the base 19A of the case 19 and to the drive e PCB 21.

With reference to FIG. 5, to the left of the capacitor 28 a second heat sink plate 24 is secured to the base 19A of the case 19 and to the drive PCB 21 for dissipation of the heat generated by the plurality of free wheeling diodes 26.

A first bus bar 29 is fixed to the first heat sink plate 23 by a bolt which passes through the rear end part of the drive PCB 21. One end of a jumper bus bar 35 is fixed to a fourth bus bar 32, which will be described later, through the drive PCB 21, and the other end of the jumper bus bar 35 is fixed to the first heat sink plate 23 together with the first bus bar 29 by a bolt which passes through the drive PCB 21, whereby the first heat sink plate 23, the first bus bar 29 and the jumper bus bar 35 are integrated together in a stack formation.

At the sides of the first heat sink plate 23 and the second heat sink plate 24, a second bus bar 30 is positioned which is secured to each heat sink plate 23 and 24 to supply power to the motor device. The forward end of the second bus bar 30 protrudes out of the case 19, as illustrated at FIG. 4.

A third bus bar 31 of a "T" type construction is secured to the PCB 21 and is connected to a positive terminal of the capacitor 28 and to a positive terminal of the drive PCB 21.

The fourth bus bar 32 of a "T" type construction is connected to a negative terminal and a ground terminal of the drive PCB 21. The fourth bus bar 32 is also secured to the PCB 21 and is connected to the first bus bar 29 and the jumper bus bar 35 which stably supply negative power to the plurality of MOSFETS 25 fixed to the first heat sink plate 23.

A fifth bus bar 33 is secured to the side of the first heat sink plate 23 and is electrically insulated. In the middle of the fifth bus bar 33 diodes 27 of the plug diode circuit 47 protrude.

A sixth bus bar 34 connects the cathode terminals of the plug diodes 27 to the drive PCB 21. One side of the sixth bus bar 34 is connected to one side of the plug diodes 27 and the other side is connected and secured to the drive PCB 21, respectively.

Thus, the present invention provides a simplified circuit and, in particular, allows rapid control by controlling the motor with digital signal processing by utilizing the micro computer and prevents failure and malfunction of the device by solving the thermal problem of the power element.

What is claimed is:

1. A DC motor controller operated by a battery and a micro computer, comprising:
   a power source and watch dog circuit 2 for dropping the voltage of said battery and monitoring operation of said micro computer 8;
   a key switch input circuit 3 connected to said power source and watch dog circuit 2 for recognizing the operation state of a key switch;

a pedal input circuit 4 for converting the condition of a pedal being pressed into a resistance value;

a vehicle running direction changing sensor 6 for sensing the running direction of a vehicle;

a battery voltage sensor 7 for sensing the voltage of said battery;

wherein the micro computer 8 is connected to said power source and watch dog circuit 2, said pedal input circuit 4, said vehicle running direction changing sensor 6 and said battery voltage sensor 7 for processing the input signals inputted therefrom;

a D/A converter 9 connected to said micro computer for converting the digital signal inputted from said micro computer into an analogue signal;

a pulse—width modulator 10 connected to said D/A converter 9 for modulating the inputted signal into a signal having a pulse—width;

a gate output circuit 11 connected to said pulse—width modulator 10 for generating either a "high" or "low" level signal depending upon the input signal inputted therefrom;

a motor driver 16 connected to said gate output circuit 11, said motor driver 16 for controlling a motor device 15 connected to said motor driver 16, said controlling being according to an input signal from said gate output circuit 11, with said motor driver 16 further including a plurality of power elements;

a mounting body 18 of heat dissipating construction for protecting said plurality of power elements comprises in said motor driver 16 from heat;

an output current sensor 12 connected to said motor driver 16 for sensing the output current transferred from said motor driver 16 and supplying the sensed signal to said micro computer 8; and a temperature sensor 13 connected to said motor driver 16 for sensing the temperature of said motor driver 16 and supplying the sensed signal to said micro computer 8.

2. The DC motor controller of claim 1, wherein said motor driver 16 comprises a first to a sixth FET driver 41 to 46, and each FET driver comprises:

a free wheeling diode D1 connected to a B+power source terminal;

a MOSFET Q1 connected between said free wheeling diode D1 and a ground, said MOSFET a1 having a gate terminal connected to said gate output circuit 11 via a resistor R1;

a capacitor C1 connected between the ground and a connection point between said free wheeling diode D1 and said B+power source terminal;

a MOSFET Q2 connected between the ground and a connection point P2 between said free wheeling diode D1 and said MOSFET Q1, said MOSFET Q2 having a gate terminal connected to said gate output circuit 11 via a resistor R2; and a diode D2 and a Zener diode DZ1 connected in series between said connection point P2 and said gate terminal of said MOSFET Q2.

3. The DC motor controller of claim 1 or 2, said mounting body 18 of heat dissipating construction comprises:

a control PCB 20 and a drive PCB 21 provided at the upper and middle part of a case 19, with said control PCB 20 being positioned at the upper part relative to said drive PCB 21; said case 19 further including a base 19A;

a third heat sink plate 22 for connecting said control PCB 20 to said drive PCB 21 by bolts 22A in longitudinal direction;

a capacitor 28 fixed below and in the middle of said PCB 21 which is mounted in said case 19;

a first heat sink plate 23 mounted at the back of said PCB 21 to fix it between said case 19 and the base of said PCB 21, for dissipating the heat of a plurality of MOSFET 25 mounted thereto;

a second heat sink plate 24 mounted at said base of said PCB 21 and said case 19 to fix it to one side of said capacitor 28, to dissipate heat generated by a plurality of said free wheeling diodes 26;

a first bus bar 29 fixed on said first heat sink plate 23 by bolts 29A passing through the rear end of said PCB 21 for supplying power to said plurality of MOSFET 25 mounted to said heat sink plate 23;

a second bus bar 30 fixed at the side of said first heat sink plate 23 and said second heat sink plate 24 for supplying negative power source to said motor device;

a third bus bar 31 of T type construction fixed to said drive PCB 21 and connected to a positive terminal of said capacitor 28 and a positive terminal of said drive PCB 21;

a fourth bus bar 32 of T type construction connected to both a negative terminal of said capacitor 28 and a ground terminal of said drive PCB 21, and connected to said first bus bar 29, fixed to said first heat sink part 23 via a jumper bus bar 35, to thereby fix it to said drive PCB 21;

a fifth bus bar 33 fixed at another side of said first heat sink plate 23 as being electrically insulated, and in the middle part of said bus bar 33 a pair of plug diodes 27 penetrate; and a sixth bus bar 34 which connects cathode terminals of said plug diodes 27 to said drive PCB 21, one side of said bus bar 34 being fixed to one side of said plug diodes 27, and the other side of which is fixed to said drive PCB 21.

4. A DC motor controller for use with a battery powered DC motor, said controller comprising:

a micro computer 8;

a power source-watch dog circuit 2 for monitoring said micro computer 8 and for decreasing the battery supplied voltage to below a predetermined voltage;

a key switch input circuit 3 for receiving a switch-on signal generated by a key switch and for outputting a signal to said power source-watch dog circuit 2 to initiate electrical power output from the battery 1 to said micro computer 8;

a pedal input circuit 4 including a pedal for varying electrical resistance in accordance with the extent said pedal is pressed, said pedal input circuit 4 converting said varied resistance into an analog signal and outputting said analog signal to said micro computer 8;

said micro computer converting said analog signal to a digital signal and outputting said digital signal;

a D/A converter for converting said digital signal outputted by said micro computer into an analog signal and outputting said analog signal;

a pulsewidth modulator 10 for modulating said analog signal outputted by said D/A converter and outputting said modulated signal; and a gate output circuit 11 for generating a logic signal having a "high" or a "low" level according to said modulated signal outputted by said pulsewidth modulator 10 and outputting said logic signal to a motor driver 16 which operates said DC motor in accordance with said logic signal outputted from said gate output circuit 11.

5. The DC motor controller of claim 4 further including an output current sensor circuit 12 for sensing current flowing through said motor driver 16 and outputting a current sensor signal to said micro computer 8.

6. The DC motor controller of claim 4 further including a temperature sensor 13 for sensing the temperature of said motor driver and outputting a temperature sensor signal to said micro computer 8.

7. The DC motor controller of claim 4 further including a battery regulation circuit 5 for providing uniform electrical power to said DC motor 17.

8. The DC motor controller of claim 4 for use in a DC motor powered vehicle and further including a vehicle direction changing sensor 6 for preventing an overload of said DC motor 17 by sensing an abrupt change in direction the vehicle is being driven and outputting a vehicle direction changing sensor signal to said micro computer 8.

9. The DC motor controller of claim 4 further including a battery voltage sensor 7 for sensing the voltage of said battery 1 and outputting a battery voltage sensor signal to said micro computer 8.

10. A DC motor controller for use with a battery powered DC motor operatively positioned in a vehicle, said controller comprising:

a micro computer 8;

a power source-watch dog circuit 2 for monitoring said micro computer 8 and for decreasing the battery supplied voltage to below a predetermined voltage;

a key switch input circuit 3 for receiving a switch-on signal generated by a key switch and for outputting a signal to said power source-watch dog circuit 2 to initiate electrical power output from the battery 1 to said micro computer 8;

a pedal input circuit 4 including a pedal for varying electrical resistance, said pedal input circuit 4 converting said varied resistance into an analog signal and outputting said analog signal to said micro computer 8;

said micro computer converting said analog signal to a digital signal and outputting said digital signal;

a D/A converter for converting said digital signal outputted by said micro computer into an analog signal and outputting said analog signal;

a pulsewidth modulator 10 for modulating said analog signal outputted by said D/A converter and outputting said modulated signal;

a gate output circuit 11 for generating a logic signal having a "high" or a "low" level according to said modulated signal outputted by said pulsewidth modulator 10 and outputting said logic signal to a motor driver 16 which operates said DC motor in accordance with said logic signal outputted from said gate output circuit 11;

a battery voltage sensor 7 for sensing the voltage of said battery 1 and outputting a battery voltage sensor signal to said micro computer 8;

a temperature sensor 13 for sensing the temperature of said motor driver and outputting a temperature sensor signal to said micro computer 8;

an output current sensor circuit 12 for sensing current flowing through said motor driver 16 and outputting a current sensor signal to said micro computer 8; and a vehicle direction changing sensor 6 for preventing an overload of said DC motor 17 by sensing an abrupt change in the direction of the vehicle and outputting a vehicle direction changing sensor signal to said micro computer 8.

11. The DC motor controller of claim 10 further including a battery regulation circuit 5 for providing uniform electrical power to said DC motor 17.

12. The DC motor controller of claim 10 wherein said motor driver 16 includes a first, a second, a third, a fourth, a fifth and a sixth FET driver 41-46 electrically connected in parallel with each other, each FET driver comprising:

a free wheeling diode D1 connected to a B+terminal of a DC power source;

a MOSFET Q1 having electrodes connected to said free wheeling diode and to ground, and having gate connected to a resistor R1 which is connected to said gate output circuit 11;

a capacitor C1 connected between said B+terminal and said free wheeling diode D1 and to ground;

a MOSFET Q2 having electrodes connected to a connection point P2 between said free wheeling diode D1 and MOSFET Q1 and ground, and having gate connected to a resistor R2;

a diode D2 and a Zener diode DZ1 connected in series between said connection point P2 and said gate terminal of said MOSFET Q2; and a motor device 15 connected to said connection point P2.

13. The DC motor controller of claim 12 further including a case 19 for mounting said motor driver, wherein said case comprises:

a control PCB 20 and a drive PCB 21 positioned in the case; said case 19 further including a base 19A;

a third heat dissipating plate 22 for securing thereto said control PCB 20 and said drive PCB 21 with said control PCB spaced apart from said drive PCB;

a capacitor 28 secured below and in the middle of said drive PCB 21;

a first heat dissipating plate 23 mounted opposite said capacitor 28 on said drive PCB 21 for dissipating heat generated by said MOSFETs of each of said FET drivers mounted thereon;

a second heat dissipating plate 24 mounted between said first heat dissipating plate 23 and said capacitor 28 on said drive PCB 21 for dissipating heat generated by said free wheeling diodes of each of said FET drivers mounted thereon;

a first bus bar 29 secured on said first heat dissipating plate 23 for supplying electrical power to said MOSFETs mounted on said heat dissipating plate 23;

a second bus bar 30 secured at one side of said first heat dissipating plate 23 and said second heat dissipating plate 24 for supplying negative electrical power to said motor device;

a third bus bar 31 of T type construction secured to said drive PCB 21 and connected to a positive terminal of said capacitor 28 and a positive terminal of said drive PCB 21;

a fourth bus bar 32 of T type construction connected to both a negative terminal of said capacitor 28 and a ground terminal of said drive PCB 21, and connected to said first bus bar 29, secured to said first heat sink part 23 via a jumper bus bar 35, to thereby secure it to said drive PCB 21;

a fifth bus bar 33 electrically insulated from and secured to another side of said first heat sink plate 23 and having a pair of plug diodes 27 secured thereto; and a sixth bus bar 34 which interconnects cathode terminals of said plug diodes 27 to said drive PCB 21, one side of said bus bar 34 being fixed to one side of said plug diodes 27, and the other side of which is fixed to said drive PCB 21.

* * * * *